June 23, 1953  H. HEIDENWOLF  2,642,742
APPARATUS FOR MEASURING TEMPERATURE
Filed Sept. 5, 1947

INVENTOR.
HERMAN HEIDENWOLF
BY
ATTORNEY.

Patented June 23, 1953

2,642,742

UNITED STATES PATENT OFFICE 2,642,742

APPARATUS FOR MEASURING TEMPERATURE

Hermann Heidenwolf, Neumarkt, Steiermark, Austria, assignor to Lapp-Finze Eisenwarenfabriken-Aktiengesellschaft, Kalsdorf (Graz), Austria Application September 5, 1947, Serial No. 772,439
In Austria February 25, 1947

7 Claims. (Cl. 73—339)

This invention relates to a new apparatus for measuring temperature, more particularly to temperature measuring instruments for medical purposes. In the field of medical diagnosis, for instance, there exists a need of an instantly indicating measuring apparatus, not subject to misleading influences which might arise from a disturbed thermodynamic equilibrium at the spot of measuring with relation to neighboring spots, which disturbance might be caused by any alteration of radiation or conduction of heat, or in some cases also by evaporation of humidity, brought about by the heat-receiving measuring element of a thermometric instrument. On measuring internal temperatures, as for instance in cavities of the human body, there takes place, in addition thereto, a conduction of heat away from (or as might be in some cases up to) the spot of measuring via the thermometer in use, a feature as objectionable with regard to the accuracy of measurement as the pretty high heat inertia of known types of temperature meters (thermometers).

It is the main object of the invention to provide a temperature measuring apparatus the measuring element of which, on the one hand, is accommodated to the thermodynamic equilibrium or thermic conditions of the surface to be measured (e. g. the human skin) by matching the same conditions, and whereby the measured value, on the other hand, is transmitted to the indicating device without the aid of a mechanical linkage. An apparatus of this kind will accordingly not show the above-mentioned drawbacks. With a skin-thermometer for medical purposes, for example, such a matching of the conditions at the spot to be measured is effected according to the invention in such a way that the loss of heat of the skin brought about by radiation or conduction of heat or by evaporation of humidity is imitated—even at varying temperatures—by giving the back side of the measuring element the proper surface qualities and, for instance, by admitting atmospheric air to this side of the measuring element which is averted from the skin; to quicken the procedure of measuring, this element is so dimensioned as to have a heat capacity as low as possible.

Another object of my invention is to provide a temperature measuring apparatus which substantially consists of a permanent magnetic member movable above a heat-sensitive measuring element made of ferromagnetic material, said permanent magnetic member being connected to an indicating device, to which the measured value is transmitted by converting the momentary state of temperature into a corresponding state of the magnetic field established by said permanent magnetic member and varied according to the measured temperature by said sensitive and ferromagnetic measuring element.

A further important object of my invention resides in the provision of a ferromagnetic measuring element which works within the range of magnetic saturation by virtue of a proper dimensioning and the spatial arrangement of the permanent magnetic member with regard to said measuring element.

The invention possesses other objects and features of advantage, some of which, with the foregoing, will be set forth in the following description of some preferred forms of the invention which is illustrated in the drawing accompanying and forming part of the specification. It is to be understood, however, that variations in the showing made by said drawing and descriptions may be adopted within the scope of the invention as set forth in the claims.

Figure 1:
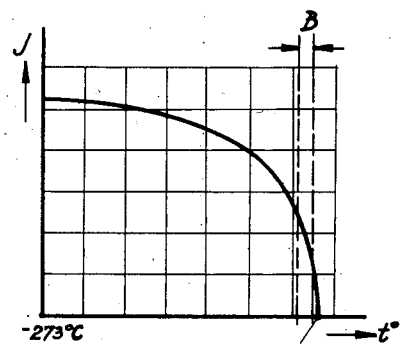
Fig. 1 is a diagram showing the run of the magnetizing intensity-temperature curve of a heat-sensitive ferromagnetic material.

Referring now in particular to Fig. 1, it is well known that the factors defining the state of ferromagnetism of a heat-sensitive material, especially the elementary spontaneous magnetizing intensity $J$, plotted against the temperature $t$, steeply descend to the so-called "curiepoint" $C$ on the abscissa. This part B of the magnetizing intensity curve forms the most advantageous range of working of the material for the measuring element. Now it is possible in mixed crystal systems to fix optionally the Curietemperature by choosing the sorts and quantities of the components of the alloy and to create by this means proper materials for thermometers having different ranges of measurement.

In cases of special requirements for the practice there may arise a desire for further improvements of such an apparatus working by means of the temperature dependency of the spontaneous magnetization. Considering a system having a permanent magnet arranged above a ferromagnetic and heat-sensitive measuring element of elliptic shape as usual and capable of being turned against the action of a spring, this magnet will come soon to a rest position dependent on the temperature of the measuring element, but the manipulation of this primitive apparatus is not a simple one, because the position of the magnet is a function of a plurality of factors which permits the utilization of the deflection of the magnet in dependency on the variation of temperature only in a small range of measurement. In contradistinction to such an arrangement there are further features of this invention which permit to make the deflection of the pointer linear, or, if desired, to stretch the scale in one or more ranges of temperature according as circumstances may require it.

Figure 2:
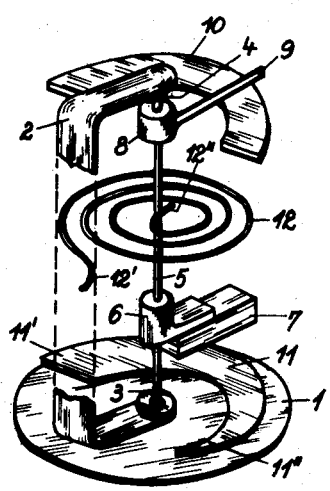
Fig. 2 is a perspective view of the turning system of one form of my invention.

In the other figures of the drawing two embodiments of magneto-thermic measuring instruments according to the invention are illustrated in a diagrammatical way. In Fig. 2, 11 indicates a thin and small plate made of a ferromagnetic alloy and suitably soldered upon the measuring element 1 which is made of good conducting metal and should be so constructed, in the manner and for the purpose set forth, as to have a low heat capacity and to match the thermic conditions of the surface to be measured; 7 designates the permanent magnetic member of a turning system upon whose shaft 5 the magnet 7 is carried by means of a supporting arm 6. The shaft 5 is engaged by one end 12" of a counteracting spring 12 whose other end 12' is anchored to a bracket 2 which rises from the element 1 and carries bearings 3, 4 for the shaft 5. Any position of the permanent magnetic member corresponds to a definite temperature within the range of measurement as the crescent shaped plate 11 is magnetized in a radial direction by the magnet 7. By a suitable dimensioning of the magnet 7 and by its arrangement close to the plate 11 the magnetization of the latter advantageously is pushed up to the point of saturation (region B in Fig. 1) in order to attain a torque as great as possible. By giving the plate 11 a proper shape, i. e. an inconstant, progressively increasing or decreasing section in its peripheric direction, the scale 19, across which a pointer 9, fastened at 8 to the shaft 5 is moving, may be made linear or even expanded within some ranges of measurement.

Figure 3:
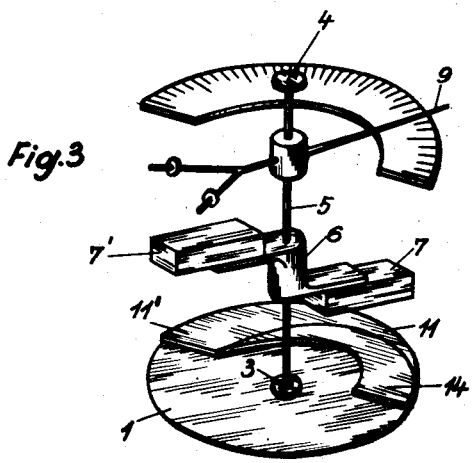
Fig. 3 is a similar perspective view of the turning system including the indicating device of a slightly modified form of my invention.

With an embodiment according to Fig. 3 the counteracting force is produced not by a spring but by a temperature-insensitive member 14 having an equally inconstant section, i. e. a section which across the whole range of turning movement of the magnet 8 continuously decreases or increases, this member 14 counteracting the action of the temperature-sensitive measuring plate with regard to the turning magnet, which latter in this case is formed, as is known per se, as an astatic couple 7, 7' for compensation of the terrestrial magnetism. By an arrangement of this kind a resulting maximum of magnetizability in radial directions is attained, involving different angles of deflection for each temperature.

It will be seen that the ferromagnetic element or plate 11 of Fig. 2, which together with the magnetic element 7 forms a path for magnetic flux, has a cross section which progressively decreases from a maximum 11' to a minimum 11". Accordingly, the reluctance of the magnetic path progressively increases as the shaft 5, together with pointer 9, moves clockwise, this being the direction in which the shaft 5 is urged by the spring 12. The magnetic attraction between the elements 7 and 11 exerts a force upon the shaft 5 tending to rotate the latter in the direction of increasing flux, i. e. counterclockwise against the action of spring 12. Since the restoring force exerted by the spring 12 progressively increases with increasing distance of the magnet 7 from the end 11" of the armature element 11, whereas dependent upon the precise configuration of the latter element the magnetic torque may vary in a desired manner or remain constant over the entire operating range, it will be apparent that at some point along the scale 10 the two opposing forces will balance each other and the system will be in equilibrium. Since, however, the reluctance of the element 11 is also dependent upon temperature, as illustrated in Fig. 1, the magnitude of the magnetic torque will vary inversely as the temperature to which the armature 11 is heated by its contact with the measuring element 1 which in turn is positioned close to the human skin or some other body whose temperature is to be measured. With increasing temperatures, therefore, the pointer 9 will position itself at points progressively closer to the reduced end (11") of the crescent-shaped armature plate, thereby enabling a direct reading of the temperature on the suitably calibrated scale 10.

Since in the case of Fig. 14 the magnetic flux passing through ferromagnetic element 14 increases as the pointer 9 moves clockwise, it will be understood that the presence of this second armature element will result in a torque upon the shaft 5 similar to that exerted in Fig. 2 by the spring 12. This torque, like that produced by the spring 12, may be caused to increase as the magnet 7 approaches the large end 11' of the highly temperature sensitive armature element 11, by suitably dimensioning the relatively temperature-insensitive element 14. It will generally be appreciated that any desired scale spread may be obtained and that the moving system may be caused to operate according to any desired law by properly grading the change in magnetic reluctance of the two bodies 11 and 14.

It is clearly understood that the transference of heat from the spot to be measured to the measuring body can be effected—as known per se—by radiation instead of conduction.

Having fully described my invention, what I claim as new is:

1. In an apparatus for measuring temperature, in combination, a permanent magnet mounted for displacement along a predetermined path, a stationary ferromagnetic element extending along said path and forming part of a magnetic circuit for lines of force extending from said magnet, said ferromagnetic element having a temperature dependent magnetic reluctance and being of progressively varying cross section whereby the amount of flux passing through said circuit will depend upon the position of said permanent magnet along said path and a force will be exerted tending to displace said magnet in the direction of increasing flux, balancing means tending to displace said magnet in the direction opposite said direction of increasing flux, and indicator means coupled with said magnet.

2. In an apparatus for measuring temperature, in combination, a stationary and a movable indicating member cooperating with each other, at least one movable ferromagnetic element, coupled to said movable indicating member, and at least one stationary ferromagnetic element having a temperature dependent magnetic reluctance, said elements forming part of a path for magnetic flux and including a permanent magnet and an armature element movable with respect to each other, said armature element being so positioned with respect to said magnet that upon relative movement between said armature element and said magnet different parts of said armature element will be included in said path, said different parts of said armature element having a progressively changing magnetic reluctance, whereby the flux through said path increases upon relative movement of said magnet and said armature element in a predetermined direction, and balancing means tending to effect a relative displacement between said magnet and said armature element in a direction opposite said predetermined direction.

3. In an apparatus for measuring temperature, in combination, a stationary and a movable indicating member cooperating with each other, a permanent magnet coupled with said movable indicating member and mounted for displacement along a predetermined path, a stationary ferromagnetic element extending along said path and forming part of a magnetic circuit for lines of force extending from said magnet, said ferromagnetic element having a temperature dependent magnetic reluctance which varies progressively along said path, whereby the amount of flux passing through said circuit will depend upon the position of said permanent magnet along said path and a force will be exerted tending to displace said magnet in the direction of increasing flux, and balancing means tending to displace said magnet in the direction opposite said direction of increasing flux.

4. The combination according to claim 3 wherein said magnet is pivotable about an axis and extends radially of said axis.

5. The combination according to claim 4 wherein said ferromagnetic element has the general configuration of part of a crescent and lies wholly in a plane parallel to the plane of rotation of said magnet.

6. The combination according to claim 3, comprising a measuring element of good thermal conductivity, said ferromagnetic element being positioned in intimate contact with said measuring element.

7. The combination according to claim 3 wherein said balancing means comprises a second ferromagnetic element, of substantially temperature independent magnetic reluctance, extending along said path and forming part of a second magnetic circuit for lines of force extending from said magnet, said second ferromagnetic element being of a cross section varying substantially inversely as the cross section of the first-mentioned ferromagnetic element, thereby giving rise to a restoring force tending to displace said magnet in the direction of increasing the flux in said second magnetic circuit.

HERMANN HEIDENWOLF.

References Cited in the file of this patent

UNITED STATES PATENTS

| Number | Name | Date |
|---|---|---|
| 1,778,653 | Wineman | Oct. 14, 1930 |

FOREIGN PATENTS

| Number | Country | Date |
|---|---|---|
| 655,747 | France | Apr. 23, 1929 |
| 664,763 | Germany | Sept. 3, 1938 |